No. 713,759. Patented Nov. 18, 1902.
R. J. GOADE.
FILTER AND FILTERING SYSTEM.
(Application filed Mar. 5, 1902.)
(No Model.) 3 Sheets—Sheet 1.
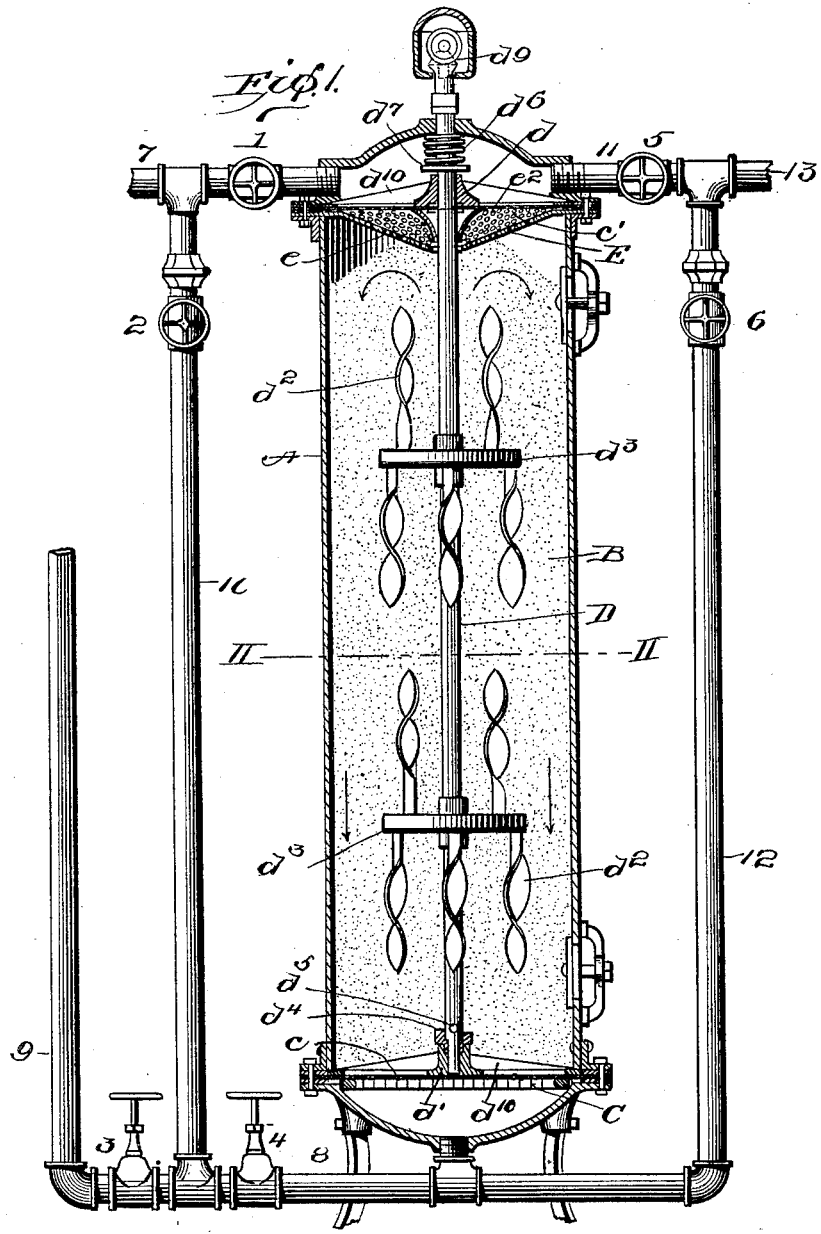
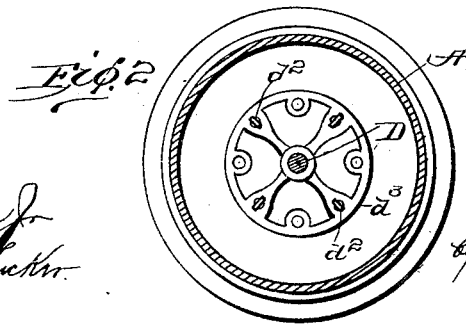

No. 713,759. Patented Nov. 18, 1902.
R. J. GOADE.
FILTER AND FILTERING SYSTEM.
(Application filed Mar. 5, 1902.)
(No Model.) 3 Sheets—Sheet 2.
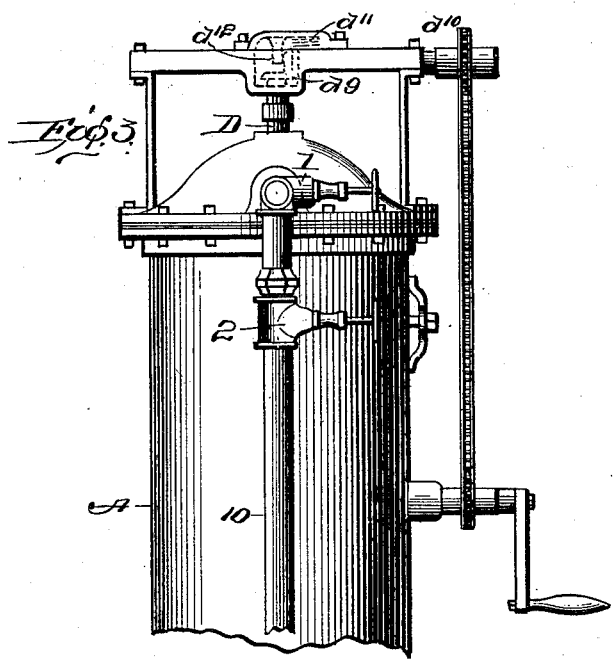
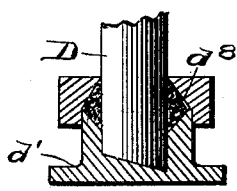
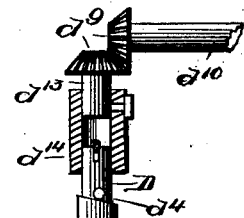
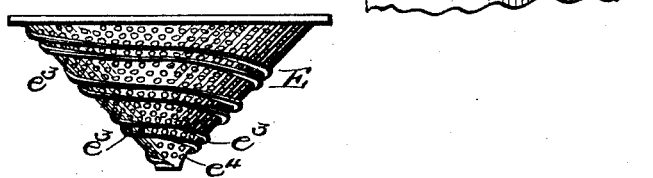
Witnesses
Inventor
Richard J. Goade,
by Spencer B. Preatiss,
his Attorney

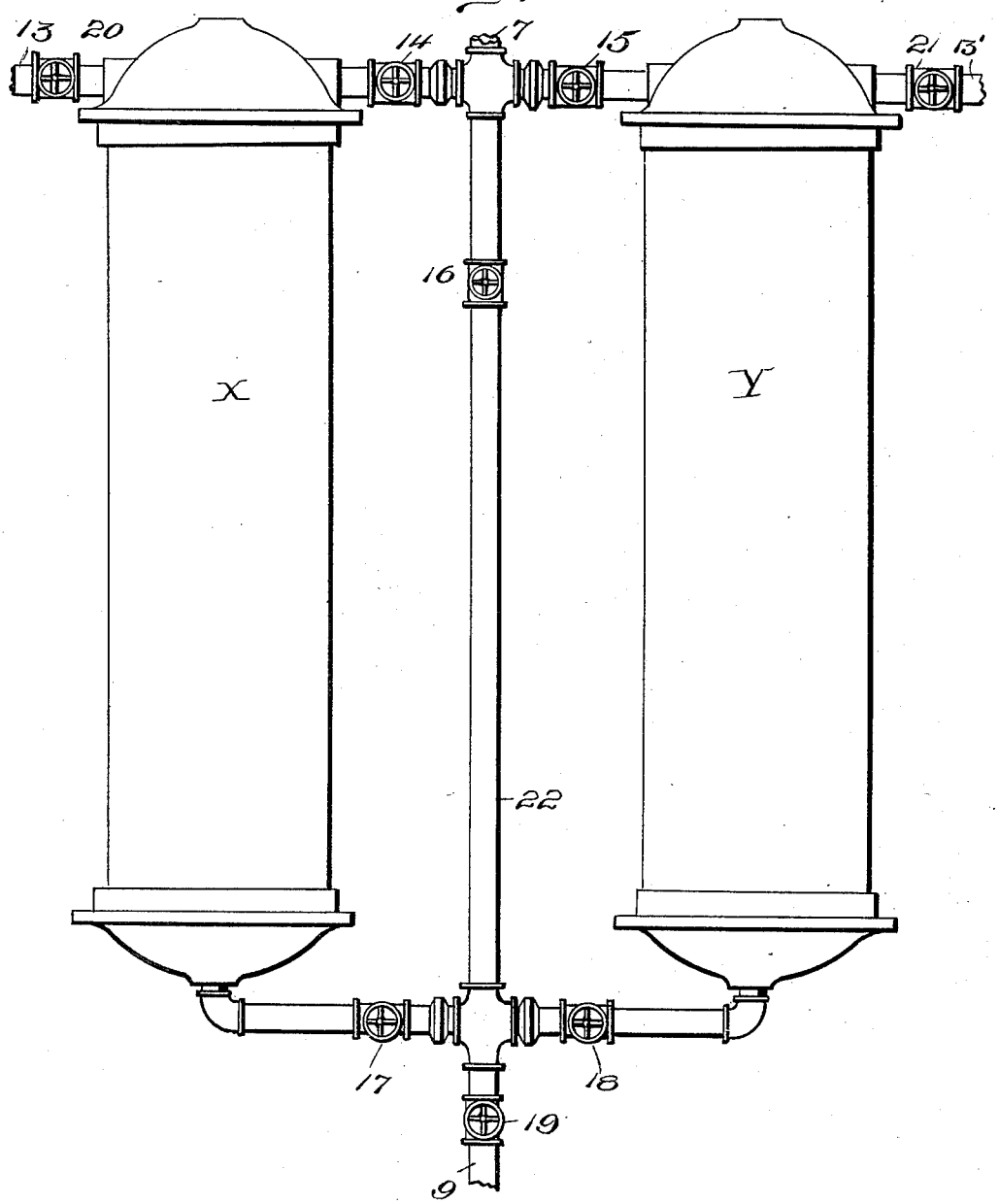

UNITED STATES PATENT OFFICE.

RICHARD J. GOADE, OF ALLENTOWN, PENNSYLVANIA.

FILTER AND FILTERING SYSTEM.

SPECIFICATION forming part of Letters Patent No. 713,759, dated November 18, 1902.

Application filed March 5, 1902. Serial No. 96,819. (No model.)

*To all whom it may concern:*

Be it known that I, RICHARD J. GOADE, a citizen of the United States, residing at Allentown, in the county of Lehigh and State of Pennsylvania, have invented a new and useful Filter and Filtering System, of which the following is a specification.

My invention relates to the construction of apparatus in which a liquid is caused to percolate through an inclosed mass of solid matter in a divided or granular state; and it relates more particularly to filters in which the cleansing or purifying medium is composed of granular material—that is to say, granular bed-filters. In this class of filters the liquid to be purified is caused by pressure to pass through the mass of granular material, which latter detains the impurities, these accumulating until it becomes desirable or necessary to remove them. It is upon the thoroughness of this elimination from the filtering material of its collected impurities that the efficiency and sanitary value of the apparatus depend, and the improvement of means for effecting this elimination in devices of the character referred to is therefore the principal object of my invention.

A further object is to provide simple and efficient means to cause the agitation and circulation of an inclosed mass of granular material during the percolation of a liquid therethrough.

Other objects will more fully appear as I proceed with the description of my improvements.

My invention is illustrated in the accompanying drawings, in which like reference characters indicate corresponding parts throughout the several figures, and in which—

Figure 1 is a longitudinal sectional view of a filter, the pipe connections and valves being shown in elevation. Fig. 2 is a plan view in section of the same, taken on the line II II of Fig. 1. Fig. 3 is a view in side elevation of the upper portion of the filter shown in Fig. 1. Fig. 4 is an enlarged detail showing a modification of means for giving a reciprocatory motion to the agitator-shaft. Fig. 5 shows another modification of the means for accomplishing the same result, together with the rotary driving-gear. Fig. 6 is a detached view of a modification of the filter-bed deflector shown in Fig. 1. Fig. 7 is a diagrammatic view of my system employing a double filter, the cleansing mechanism being omitted for clearness.

In explaining my invention I have shown and shall describe the same as applied to filters designed to cleanse and purify water as it enters a building from the supply-mains, the water then circulating through the pipes of the house or building.

Referring to the drawings, A is a shell constituting a filtering-chamber containing granular material B, such as sand. The granular material is supported by grate C and bronze wire-cloth $c$ in the lower portion of the chamber, these being secured to or resting upon the shell in any suitable manner. A second piece of wire-cloth $c'$ is secured in the upper part of the chamber to prevent the escape of granular material. A shaft D is mounted within the shell in bearings $d\ d'$, carried by grates or spiders $d^{10}$, suitably secured to the shell. Upon shaft D is mounted the agitator for the filter-bed, consisting in this instance of spiral blades $d^2$, mounted in sets upon supports $d^3$, secured to the shaft. The direction of the turns of these spiral blades is such that when the shaft is revolved in the proper direction and the flow of liquid through the filter reversed an upward motion will be given to the central portion of the filter-bed as well as a rotary movement. In order to accentuate this action, I also provide means for giving to the shaft, and consequently the agitator, a reciprocatory motion, and this I accomplish, preferably, by means of a cam. As shown in Fig. 1, the shaft-bearing $d'$ is formed with an upper cam-surface $d^4$, which is engaged by pin $d^5$ upon the shaft. This cam-surface may be so formed that a gradual upward movement of the shaft during rotation will be caused until its extreme upper position is reached, when it will be permitted to return under the action of spring $d^6$, bearing upon collar $d^7$ upon the shaft, to its extreme lower position. Instead of this cam and pin construction I may form the bearing-block $d'$ with a sloping bottom and cut the end of the shaft D to correspond, as shown in Fig. 4, a suitable packing $d^8$ being employed to keep the grit of the bed from the bearing-surfaces, or a cam may be formed upon the top or dome of the filter-shell, as shown in Fig. 5, the shell being made extra heavy to stand the strain.

Shaft D is driven by any suitable mechanism, such as the crank, chain, and sprocket (shown in Fig. 3) acting through bevel-gears $d^9$ and shaft $d^{10}$. The bevel-gears $d^9$ are held in engagement during the reciprocation of the shaft D by spring $d^{11}$, bearing upon shaft $d^{10}$, the other bearing of this latter shaft being formed elliptical or otherwise to allow a slight rocking motion. A stop $d^{12}$ is provided upon the upper part of the frame to limit the upward movement of shaft D.

Instead of the method just described of arranging for the constant engagement of the bevel-gears $d^9$ I may, as shown in Fig. 5, connect a detached section $d^{13}$ of shaft D, carrying one of the gears to said shaft D by means of a sleeve or collar $d^{14}$, which is slidably keyed to either said shaft or section and rigidly secured to the other. In this case shaft $d^{10}$ and section $d^{13}$ are mounted in ordinary bearings. Other means to accomplish the same objects may be devised; but having described two further illustration is deemed unnecessary.

In order to turn the filter-bed outwardly toward the shell sides as it is brought up the center by the agitator, I provide a deflector E, secured in the upper part of the filtering-chamber below the wire-cloth $c'$. This consists, preferably, of a metallic cone-shaped piece having perforations $e$, the apex of the cone pointing downwardly. The opening at the apex of the cone through which the shaft D passes is made slightly larger than said shaft in order that any particles of the granular bed which are carried through the perforations may return to the filtering-chamber. A rubber or leather collar is placed around the shaft within the cone to protect the bearing $d$ from the granular material.

The deflector E may in some cases be constructed as shown in Fig. 6, where it will be seen that ridges or flanges $e^3$ are provided, circling spirally from the apex of the cone upward toward its base. As the central portion of the filter-bed is given an upward movement by the agitator, it also has a revolving or circular motion, and when it comes in contact with the deflector the flanges $e^3$ are presented in the path of movement at such an angle as to aid the inclined surface of the cone in turning the bed toward the sides of the shell. In this figure also the pitch of the cone is increased near the apex, as at $e^4$.

Suitable hand-holes are provided, as shown, through which the filter-bed may be removed or introduced. Pipe connections also are provided, as shown, which have suitable valves to control the entrance of liquid to and exit from the filtering-chamber.

The operation of the filter is as follows: In normal working—that is, when water is being filtered—valves 1, 4, and 3 are open and valves 2, 5, and 6 are closed. Water then enters from the mains through pipe 7 and circulates downwardly through the filter-bed and through pipes 8 and 9 to the house-pipes. In order to clean the filter, valves 1 and 3 are closed and valves 2 and 5 opened, 4 being open and 6 closed, as before. Water entering pipe 7 now passes downwardly through pipe 10 and pipe 8, up through the filter-bed and out through pipe 11 to waste-pipe 13. At the same time the crank of the operating mechanism is turned to put the agitator, conveyer, or scrubbers in motion, thus causing the bed to circulate within the shell, as shown by the arrows, so that every part and practically all of the granular material is exposed to the washing action of the water and all of the collected impurities are carried off and discharged through pipe 13. When this operation has continued a sufficient length of time, valves 2, 4, and 5 are closed and 6 is opened, when the water will pass downwardly through the filter and carry off the unfiltered water which remains in the bed and pipes, when 6 is closed and 4 and 3 again opened. Filtered water is then being supplied to the house-pipes, as before.

Sometimes one filter is insufficient to do the work required of it, either because it is impracticable to make one large enough or because the required output of filtered water varies, and one filter alone would at times be too small, or for other reasons, such as the increase of a filtering-plant already installed. To meet these conditions, I have devised the system of double filters illustrated in Fig. 8, which also has many advantages besides filling the above requirements. Referring to the figure it will be seen that the inlet-pipe 7 enters a pipe connecting the tops of the filters X and Y, this last-named pipe communicating through pipe 22 with the pipe connecting the lower portions of the two filters. 13 13' are discharge-pipes for the waste in cleaning, and 9 is the outlet-pipe for filtered water, connecting with the house-pipes. Valves are placed, as shown. By this arrangement each filter may be used separately to supply filtered water or both may be used at once; also, each filter may be cleaned with filtered water from the other.

Suppose it is desired to clean X with filtered water from Y. The valves all being closed and water entering under pressure through pipe 7, valves 15, 18, 17, and 20 are opened, when the circulation will be down through filter Y and up through filter X, the agitators (not shown in the diagram) being operated. Similarly Y may be cleaned with the filtered water of X by closing valves 15 and 20 and opening 14 and 21.

To clean both filters simultaneously with unfiltered water, valves 14 and 15 are closed and valves 16, 20, and 21 are opened, (17 and 18 being open, as before.) As the manner of supplying filtered water to the outlet-pipe 9 from either one or both of the filters is perfectly obvious from the foregoing description of the single filters and from the drawings, further description is deemed unnecessary.

Although I have illustrated and described my invention as applied to water-filters, I do not wish to limit myself or the scope of the invention to the particular apparatus shown, as it is capable of many other applications and many variations in form, and the details of the parts may be introduced without departing from the spirit of the invention; also, it it not necessary that the various features of my improvements be embodied in one machine, as they may be well adapted and individually applicable to filters already produced or hereinafter to be devised. Further, I may in some cases prefer to vary the form of certain of the parts of my apparatus or substitute therefor an old or well-known form. For instance, instead of my improved form of agitator I may use blades secured to the shaft and projecting radially, as shown in the patent to Davis, No. 572,196. The form of the cam which I employ to give to the shaft a reciprocatory motion also may be varied, as by giving it a uniformly-sloping upper surface or varying the ratio of the rising and falling surfaces in any suitable manner. Many other changes and variations will be obvious to those skilled in the art and need not be described.

Having described my invention, what I claim as new, and desire to secure by Letters Patent, is—

1. In a filter, the combination with a filtering-chamber provided with an inlet and an outlet opening and designed to contain a body of granular filtering material, of an agitator mounted within said chamber for constant engagement with said filtering material, and means for imparting to said agitator a combined rotary and reciprocatory motion, substantially as described.

2. In a filter, the combination with a filtering-chamber provided with an inlet and an outlet opening and designed to contain a body of granular filtering material, of an agitator mounted within said chamber, and means for imparting to said agitator a combined rotary and reciprocatory motion to move the central portion of said filtering material longitudinally in said chamber, substantially as described.

3. In a filter, the combination with a filtering-chamber, of a granular bed within said chamber, an agitator movably mounted within said chamber in constant contact with said bed, and means for imparting to said agitator a combined rotary and reciprocatory motion, substantially as described.

4. In a filter, the combination with a filtering-chamber, of a granular bed within said chamber, an agitator movably mounted within said chamber constructed to move the central portion of said bed longitudinally in said chamber, and means for imparting to said agitator a combined rotary and reciprocatory motion, substantially as described.

5. In a filter, the combination with a closed filtering-chamber and a granular bed within said chamber, of a shaft suitably journaled and extending within said chamber, an agitator carried by said shaft in contact with said granular bed and constructed to move the central portion of said bed longitudinally in said chamber, and means for imparting to said shaft and agitator a combined rotary and reciprocatory motion, substantially as described.

6. In a filter, the combination with a filtering-chamber, of a granular bed within said chamber, an agitator movably mounted within said chamber in contact with said bed, and a cam connection between said agitator and a stationary part of the apparatus, whereby when said agitator is rotated it will also be given a reciprocatory motion, substantially as described.

7. In a filter, the combination with a filtering-chamber, of a granular bed within said chamber, an agitator mounted within said chamber in contact with said bed, means for imparting to said agitator a combined rotary and reciprocatory motion, to give the central portion of said bed an upward movement, and a deflector mounted in the upper part of said chamber in the path of movement of said bed, substantially as described.

8. In a filter, the combination with a filtering-chamber, of a granular bed within said chamber, means for imparting to the central portion of said bed an upward and rotary movement, and a deflector comprising an inverted-cone-shaped member having a spiral ridge or flange thereon and mounted in the upper part of said chamber in the path of movement of said bed, substantially as described.

9. In a filter, the combination with a filtering-chamber, of a granular bed within said chamber, means for imparting to the central portion of said bed an upward and rotary movement, and a deflector suitably shaped and having a spiral ridge or flange thereon and mounted in the upper part of said chamber in the path of movement of said bed, substantially as described.

10. In a filter, the combination with a filtering-chamber, of a granular bed within said chamber, means for imparting to the central portion of said bed an upward movement, and a deflector for said bed comprising an inverted-cone-shaped member mounted in the upper part of said chamber, said deflector being provided with perforations to permit the downward flow of liquid to be filtered and the upward flow of liquid carrying impurities, substantially as described.

In testimony whereof I have signed my name to this specification in the presence of two subscribing witnesses.

RICHARD J. GOADE.

Witnesses:
WALTER J. SAEGER,
C. B. TUNCK.